(12) United States Patent
Klein et al.

(10) Patent No.: US 6,913,817 B2
(45) Date of Patent: Jul. 5, 2005

(54) BIAXIALLY ORIENTED POLYESTER FILM WHICH IS MATT ON ONE SIDE AND HAS CHARACTERISTIC SHRINKAGE PROPERTIES, PROCESS FOR ITS PREPARATION AND ITS USES

(75) Inventors: Oliver Klein, Mainz (DE); Herbert Peiffer, Mainz (DE); Matthias Konrad, Hofheim (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 10/765,242

(22) Filed: Jan. 26, 2004

(65) Prior Publication Data

US 2004/0157069 A1 Aug. 12, 2004

(30) Foreign Application Priority Data

Jan. 28, 2003 (DE) ......................................... 103 03 145

(51) Int. Cl.$^7$ .................. B32B 27/08; B32B 27/118; B32B 27/20; B32B 27/36; B32B 31/30
(52) U.S. Cl. .................. 428/323; 428/480; 428/910; 264/288.4; 264/290.2; 528/302; 528/308; 528/308.1; 528/308.6
(58) Field of Search ................. 428/323, 480, 428/910; 264/288.4, 290.2; 528/302, 308, 308.1, 308.6

(56) References Cited

U.S. PATENT DOCUMENTS

| | | | | |
|---|---|---|---|---|
| 3,154,461 A | | 10/1964 | Johnson ...................... 161/116 |
| 4,818,581 A | * | 4/1989 | Katoh et al. ................. 428/143 |
| 5,077,118 A | * | 12/1991 | Hasegawa et al. ........... 428/149 |
| 6,083,617 A | * | 7/2000 | Aoyama et al. ............. 428/327 |
| 6,316,096 B1 | * | 11/2001 | Yoshida et al. ............. 428/331 |
| 6,319,587 B1 | * | 11/2001 | Okazaki et al. ............. 428/141 |
| 6,331,344 B1 | * | 12/2001 | Okazaki et al. ............. 428/141 |
| 6,383,729 B1 | * | 5/2002 | Ohnuma et al. ............. 430/533 |
| 6,607,808 B2 | * | 8/2003 | Peiffer et al. ................ 428/141 |
| 6,627,295 B2 | * | 9/2003 | Peiffer et al. ................ 428/141 |
| 6,630,224 B2 | * | 10/2003 | Peiffer et al. ................ 428/141 |
| 6,670,030 B1 | * | 12/2003 | Uchida et al. ............... 428/323 |
| 6,761,968 B2 | * | 7/2004 | Kusume et al. .............. 428/328 |
| 6,773,802 B2 | * | 8/2004 | Kobayashi et al. .......... 428/323 |
| 6,797,359 B2 | * | 9/2004 | Janssens et al. ............. 428/141 |
| 6,855,395 B2 | * | 2/2005 | Janssens et al. ............. 428/141 |
| 2002/0068158 A1 | * | 6/2002 | Peiffer et al. ................ 428/220 |
| 2002/0068159 A1 | * | 6/2002 | Peiffer et al. ................ 428/220 |
| 2002/0071945 A1 | * | 6/2002 | Peiffer et al. ................ 428/220 |
| 2002/0160168 A1 | * | 10/2002 | Peiffer et al. ................ 428/215 |
| 2002/0160171 A1 | * | 10/2002 | Peiffer et al. ................ 428/220 |
| 2004/0009342 A1 | * | 1/2004 | Janssens et al. ............. 428/323 |
| 2004/0009355 A1 | * | 1/2004 | Janssens et al. ............. 428/430 |
| 2004/0081840 A1 | * | 4/2004 | Kiehne et al. ............... 428/482 |
| 2004/0086734 A1 | * | 5/2004 | Janssens et al. ............. 428/482 |
| 2004/0142147 A1 | * | 7/2004 | Peiffer et al. ................ 428/141 |
| 2004/0142194 A1 | * | 7/2004 | Peiffer et al. ................ 428/500 |
| 2004/0146724 A1 | * | 7/2004 | Peiffer et al. ................ 428/458 |
| 2004/0151897 A1 | * | 8/2004 | Konrad et al. .............. 428/327 |
| 2004/0247909 A1 | * | 12/2004 | Bartsch et al. .............. 428/480 |

FOREIGN PATENT DOCUMENTS

| | | | |
|---|---|---|---|
| DE | 23 53 347 | 10/1972 | |
| EP | 0 053 498 A2 | 6/1982 | ........... B32B/27/36 |
| EP | 0 347 646 A2 | 12/1989 | ........... B32B/27/20 |

* cited by examiner

Primary Examiner—Vivian Chen
(74) Attorney, Agent, or Firm—ProPat, L.L.C.

(57) ABSTRACT

Biaxially oriented polyester films which have a polyester-containing base layer (B) and a matt overlayer (A), and are characterized by the following features: a) the transverse shrinkage of the film is between 1 and 2.3%, b) the transverse linear expansion of the film during thermo-mechanical analysis is smaller than or equal to 0.2%, c) the matt overlayer comprises particles, preferably $SiO_2$, whose median diameter is from 2 to 10 μm and whose SPAN98 is smaller than or equal to 2, and d) the matt overlayer (A) comprises a polyester which has from 4 to 30 mol % of isophthalic acid units are notable in particular for low opacity, high transparency and low gloss of the overlayer (A), and are therefore suitable as flexible packaging films and for the purposes of hot lamination.

24 Claims, 3 Drawing Sheets

PET-PE   PAPER/PAPERBOARD   PE-PET

BIAXIALLY ORIENTED POLYESTER FILM WHICH IS MATT ON ONE SIDE AND HAS CHARACTERISTIC SHRINKAGE PROPERTIES, PROCESS FOR ITS PREPARATION AND ITS USES

FIELD OF THE INVENTION

The invention relates to a coextruded, biaxially oriented polyester film which is matt on one side and consists of at least one base layer (B) and at least one matt overlayer (A) applied to this base layer (B). The film features a characteristic matt surface of the overlayer (A) and low opacity. Moreover, the film is characterized by characteristic shrinkage properties. The invention further relates to a process for producing the film and to its use.

BACKGROUND OF THE INVENTION

The packaging industry has a high demand for transparent, highly glossy plastics films, for example biaxially oriented polypropylene or biaxially oriented polyester films. In addition, there is to an increasing degree a demand for those transparent films in which at least one surface layer is not highly glossy, but rather features a characteristic matt appearance and thus, for example, confers on the packaging a particularly attractive and therefore commercially effective appearance.

Typical applications for polyester films having at least one matt surface are outer packagings for coffee, tea, soups or of selected drugstore items. In addition to the commercially effective appearance, the matt side of the film renders the surface nonreflective.

In addition, such films are used to cover, for example, maps, menus, posters or books. In this application, these films have the function of protecting the product below it, and they again advantageously render the surface unreflective. For this purpose, the processor initially laminates the polyester film with a PE layer or with a PE film which serves as an adhesive layer. In the first case, this is effected by extruding the PE layer on the polyester film, in the second case by adhering the PE film to the polyester film (cf. FIG. 1). The processor also converts the laminate of PE and PET film to smaller rolls before it reaches the end user. The end user laminates the laminate onto the paper/the cardboard, and the adhesion between the PE and the paperboard is provided by the action of heat by means of heated rolls. The roll application of the film composite to the paperboard is referred to as hot lamination. So that no creases are formed in the film when the film laminate is roll-applied onto the paperboard, the shrinkage of the polyester film should have certain characteristic features. The specific shrinkage characteristics of the polyester film according to the invention results in constant roll-application performance of the film laminate within the relevant temperature range (from approx. 80 to 120° C., depending on the PE used), which in particular allows bubble and crease formation to be prevented.

EP-A-0 347 646 describes a biaxially oriented polyester film which has at least one overlayer A which contains a filler in a concentration of from 0.5 to 50%, in which the diameter of this filler is in a certain ratio to the layer thickness of the overlayer A. In addition, the overlayer A has a certain thickness and a certain degree of crystallization which is determined with the aid of Raman spectroscopy. As a consequence of the topography of the overlayer A, the film is especially suitable for magnetic recording tapes. The document gives no information about the gloss of the overlayer A achieved. A film produced according to EP-A-0 347 646 (Example 1) did not have the desired matt surface.

EP-A-0 053 498 describes a multilayer, biaxially oriented polyester film which has a transparent base layer (B) and a further layer (A) having a matt appearance and applied to at least one side of this layer. This layer having a matt appearance consists substantially of a polyethylene terephthalate copolyester which contains $H(-OCH_2CH_2-)_nOH$ or $H(-OCH_2-CH_2-)_{n-1}O-C_6H_4-O-(CH_2-CH_2O-)_{n-1}H$ or $H(-OCH_2-CH_2-)_{n-1}O-C_6H_4-X-C_6H_4-O-(CH_2-CH_2O-)_{n-1}H$ units (n is an integer from 2 to 140, X is $-CH_2-$, $-C(CH_3)_2-$ or $-SO_2-$) and inert inorganic particles having an average diameter of from 0.3 to 20 µm in a concentration of from 3 to 40%, based on the layer having a matt appearance. The film features a high degree of mattness (gloss less than 15) and a transparency which is still acceptable for certain applications (greater than 60%). A disadvantage of this film is that it is not printable in the case of an ABA structure and cannot be processed, especially on high-speed machines, in the case of an AB structure. Moreover, it is too opaque for many applications and has deficiencies in the production.

The prior art likewise discloses matt, biaxially oriented polyester films having a milky appearance.

DE-A-23 53 347 describes a process for preparing a single-layer or multilayer, milky polyester film, which comprises forming a loosely blended mixture of particles of a linear polyester with from 3 to 27% by weight of a homopolymer or copolymer of ethylene or propylene, extruding the blend as a film, quenching and biaxially orienting the film by stretching it in mutually perpendicular directions, and heat setting the film. A disadvantage of the process is that the regrind (substantially a mixture of polyester raw material and ethylene or propylene copolymer) which occurs in the production of the film can no longer be reused in the film production, since the film otherwise becomes yellow. This makes the process uneconomic and the yellowish film produced with regrind was not able to become established on the market. When the concentration of the copolymer in the polyester is increased, the film generally loses its milky character and becomes white with high opacity.

U.S. Pat. No. 3,154,461 claims a biaxially oriented film of a thermoplastic (for example polyethylene terephthalate, polypropylene), said film having a matt surface and containing incompressible particles (for example calcium carbonate, silicon dioxide) in a size of from 0.3 to 20 µm and in a concentration of from 1 to 25%. However, this film is too opaque for many applications.

SUMMARY OF THE INVENTION

It is therefore an object of the present invention to provide a biaxially oriented polyester film which is matt on at least one side and does not have the disadvantages of the prior art films mentioned, and features in particular a high degree of mattness with simultaneously low opacity, in particular low volume opacity, and good transparency, very good producibility and very good processibility. In addition, it should be ensured that the film can also be processed on high-speed processing machines. It should in particular be suitable for the hot lamination application and in this regard feature specific, desired shrinkage behavior. In the production of the film, it should also be ensured that it is possible to recycle the offcut material occurring in the course of film production back to the production process as regrind, without the physical and optical properties of the film being significantly adversely affected.

This object is achieved by a biaxially oriented polyester film which has at least one base layer (B) and at least one matt overlayer (A) and is characterized by the following features:

a) The transverse shrinkage $s_T$ of the film is preferably in the range from 1.0 to 2.3%.
b) The film has a TMA (thermo-mechanical analysis) in which the transverse linear expansion of the film within the overall temperature range (corresponds to a temperature range of from +30° C. to +220° C. at a heating rate v=20 K/min) is smaller than or equal to 0.2%.
c) The matt overlayer (A) comprises particles which preferably have a median particle diameter $d_{50}$ of from 2 to 10 μm and
d) a SPAN98 smaller than or equal to 2.
e) The overlayer (A) comprises a polyester which has isophthalic acid units, preferably from 4 to 30 mol % of isophthalic acid units, based on the total amount of acid in the polyester in this layer.

The definition and determination of the abovementioned parameters is described in detail under measurement methods.

Particular preference is given to the transverse shrinkage of the film being from 1.2 to 2.2%, in particular from 1.4 to 2.1%, and to the transverse linear expansion of the film during TMA being ≦0.18%, in particular ≦0.16%.

The matt overlayer (A) contains the particles preferably in a concentration of from 10 000 to 70 000 ppm.

DETAILED DESCRIPTION OF THE INVENTION

Figure 1:
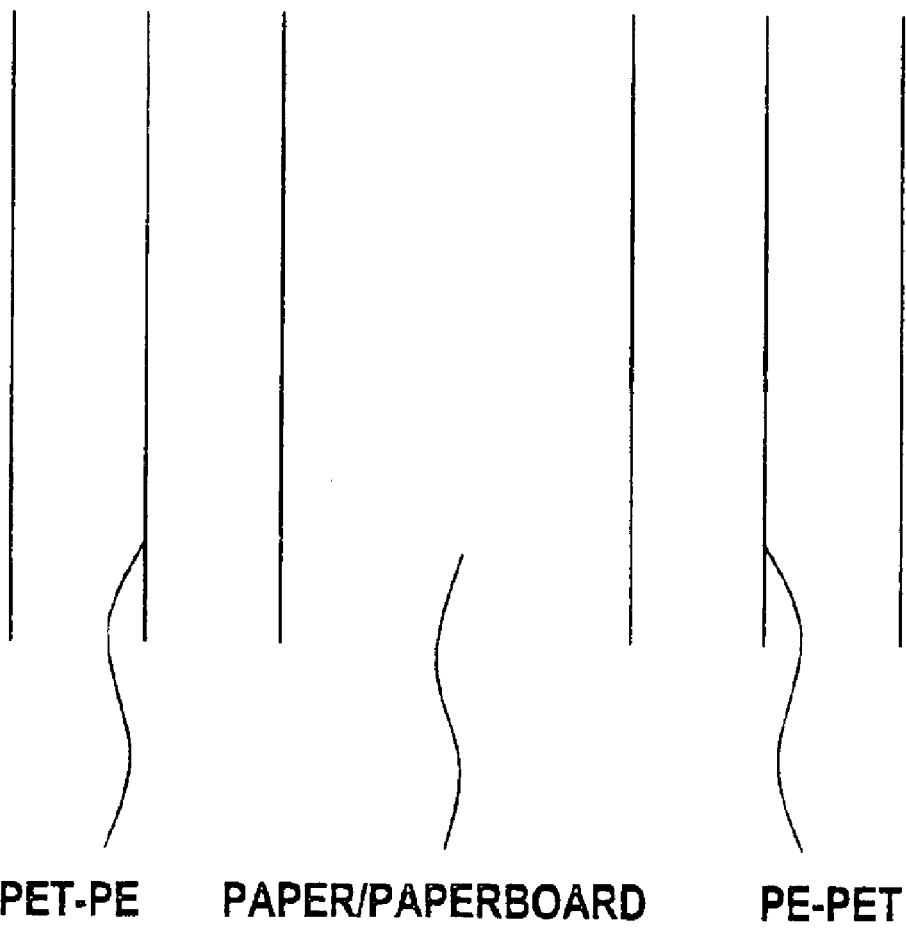
FIG. 1 is a cross-sectional view of a laminate in accordance with advantageous aspects of the invention.
Figure 2:
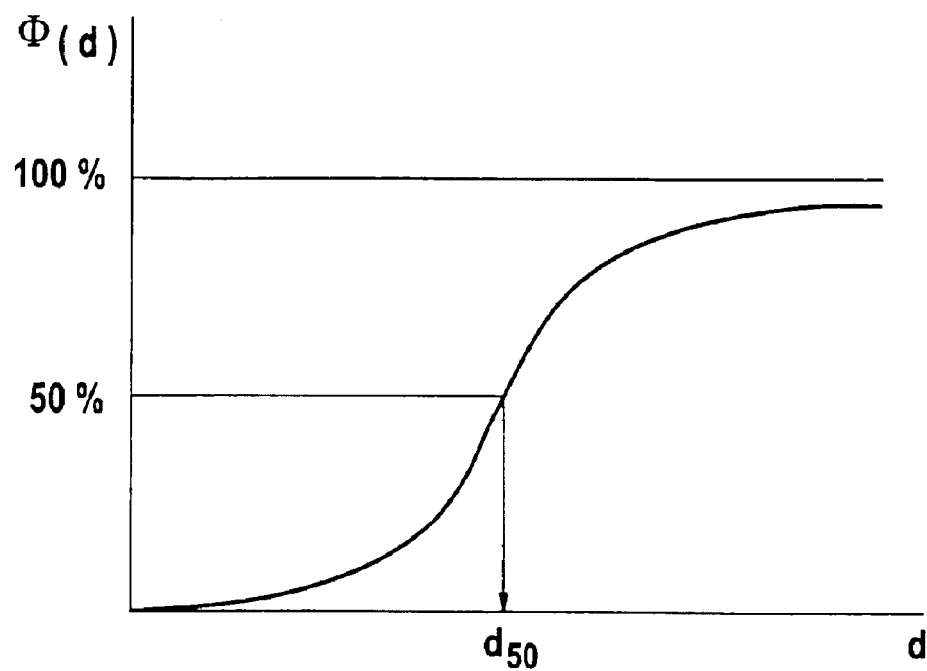
FIG. 2 is an exemplary plot of a cumulative particle size distribution curve illustrating a median particle diameter, $d_{50}$.

According to the invention, the film has at least two layers, and its layers are in that case the base layer (B) and the matt overlayer (A). In a preferred embodiment of the invention, the film has a three-layer structure and has, on one side of the layer (B) (=base layer), the overlayer (A) according to the invention and, on the other side of the layer (B), a further layer (C). In this case, the two layers (A) and (C) form the overlayers (A) and (C).

The base layer (B) of the film preferably contains at least 80% by weight of thermoplastic polyester, in particular at least 90% by weight of thermoplastic polyester, based on the total weight of this layer. Suitable for this purpose are, for example, polyesters of ethylene glycol and terephthalic acid (=polyethylene terephthalate, PET), of ethylene glycol and naphthalene-2,6-dicarboxylic acid (=polyethylene 2,6-naphthalate, PEN), of 1,4-bishydroxymethylcyclohexane and terephthalic acid [=poly(1,4-cyclohexanedimethylene terephthalate), PCDT], and also of ethylene glycol, naphthalene-2,6-dicarboxylic acid and biphenyl-4,4'-dicarboxylic acid (=polyethylene 2,6-naphthalate bibenzoate, PENBB). Particular preference is given to polyesters which consist of at least 90 mol %, in particular at least 95 mol %, of ethylene glycol and terephthalic acid units or of ethylene glycol and naphthalene-2,6-dicarboxylic acid units. In a very preferred embodiment, the base layer consists of polyethylene terephthalate homopolymer. The remaining monomer units stem from other aliphatic, cycloaliphatic or aromatic diols or other dicarboxylic acids. In addition to the abovementioned 80 or 90% by weight of thermoplastic polyester, up to 20% by weight, preferably up to 10% by weight, of, for example, polybutylene terephthalate (PBT) or glycol-modified PET may be present.

Suitable other aliphatic diols are, for example, diethylene glycol, triethylene glycol, aliphatic glycols of the general formula HO—$(CH_2)_n$—OH where n is an integer from 3 to 6 (propane-1,3-diol, butane-1,4-diol, pentane-1,5-diol and hexane-1,6-diol) or branched aliphatic glycols having up to 6 carbon atoms. Of the cycloaliphatic diols, mention should be made of cyclohexanediols (in particular cyclohexane-1, 4-diol). Suitable other aromatic diols correspond, for example, to the formula HO—$C_6H_4$—X—$C_6H_4$—OH where X is —$CH_2$—, —$C(CH_3)_2$—, —$C(CF_3)_2$—, —O—, —S— or —$SO_2$—. In addition, bisphenols of the formula HO—$C_6H_4$—$C_6H_4$—OH are also very suitable.

Other aromatic dicarboxylic acids are preferably benzenedicarboxylic acids, naphthalenedicarboxylic acids, for example naphthalene-1,4- or -1,6-dicarboxylic acid, biphenyl-x,x'-dicarboxylic acids, in particular biphenyl-4,4'-dicarboxylic acid, diphenylacetylene-x,x'-dicarboxylic acids, in particular diphenylacetylene-4,4'-dicarboxylic acid, or stilbene-x,x'-dicarboxylic acids. Of the cycloaliphatic dicarboxylic acids, mention should be made of cyclohexanedicarboxylic acids, in particular cyclohexane-1,4-dicarboxylic acid. Of the aliphatic dicarboxylic acids, the ($C_3$ to $C_{19}$)alkanedioic acids are particularly suitable, and the alkane moiety may be straight-chain or branched.

The polyesters may be prepared, for example, by the known transesterification processes. These processes start from dicarboxylic esters and diols which are reacted with the customary transesterification catalysts, such as zinc salts, calcium salts, lithium salts, magnesium salts and manganese salts. The intermediates are then polycondensed in the presence of generally customary polycondensation catalysts such as antimony trioxide or titanium salts. The preparation may equally efficiently be effected by the direct esterification process in the presence of polycondensation catalysts. This starts directly from the dicarboxylic acids and the diols.

The matt overlayer (A) applied to the base layer (B) by coextrusion is preferably composed predominantly on the basis of polyester. According to the invention, the matt overlayer (A) comprises a polyester which contains preferably 4 to 30 mol % of isophthalic acid, preferably from 6 to 28 mol % of isophthalic acid and more preferably from 8 to 26 mol % of isophthalic acid, based on the total amount of acid of the polyester in this layer. The remaining monomer units stem from other aliphatic, cycloaliphatic or aromatic dicarboxylic acids or diols, as may also occur in the base layer and have already been described there. The polyesters described for the base layer (B) are thus also suitable in principle, after appropriate modification, for the overlayer (A).

The raw material for the overlayer (A) can be, prepared, for example, as a mixture or as a blend by copolymerizing the individual monomers or via masterbatches of different individual polymers.

In a preferred embodiment of the invention, the matt overlayer (A) contains a copolyester which is composed of terephthalate and isophthalate units and of ethylene glycol units. The proportion of terephthalate units in this copolyester, based on the total amount of acid, is preferably from 70 to 96 mol % and the corresponding proportion of isophthalate units is from 30 to 4 mol %. Particular preference is given in this context to those copolyesters in which the proportion of terephthalate units is from 72 to 94 mol % and the corresponding proportion of isophthalate units is from 28 to 6 mol %. Very particular preference is given to those copolyesters in which the proportion of terephthalate units is from 74 to 92 mol % and the corresponding proportion of isophthalate units is from 26 to 8 mol %.

In principle, the polymers used for the residual proportion, if any, of the polymers present in the overlayer (A) may be the same as have already been described for the base layer (B).

Surprisingly, it has been found that the use of the above-described raw materials for the overlayer (A) results in a film having particularly low opacity, especially low volume opacity.

To achieve the desired mattness/the desired degree of mattness, the overlayer (A) additionally comprises a particle system which is characterized by the following set of preferred parameters:

a) According to the invention, the matt overlayer (A) contains particles (=antiblocking agents) having a particle diameter $d_{50}$ of from 2.0 to 10 µm. It has been found to be particularly advantageous to use particles having a median particle diameter $d_{50}$ of from 2.2 to 9 µm, preferably from 2.4 to 8 µm and more preferably from 2.6 to 7 µm. When particles are used which have a diameter which is below 2.0 µm, increased opacity occurs (at comparable concentrations). Particles having a diameter greater than 10 µm generally cause filter problems.

b) According to the invention, the overlayer (A) contains particles whose diameters have a spread which is described by SPAN98 of ≦2.0 (see test method for definition of SPAN98). Preference is given to SPAN98 being ≦1.9, and particular preference to SPAN98 being ≦1.8. In contrast, when the overlayer (A) of the film contains a particle system in which the SPAN98 of the diameter is greater than 2.0, the gloss of the overlayer (A) becomes higher, which is undesired.

c) According to the invention, the overlayer (A) contains particles in a concentration of from 10 000 to 70 000 ppm, based on the total weight of this layer (10 000 ppm=1% by weight). The concentration of the particles is preferably from 15 000 to 65 000 ppm and more preferably from 20 000 to 60 000 ppm. In contrast, when the overlayer (A) of the film contains a particle system in which the particles are present in a concentration of less than 10 000 ppm, it is less suitable for use as a matt film. In contrast, when the overlayer (A) of the film contains a particle system in which the particles are present in a concentration of more than 70 000 ppm, the opacity of the film becomes too large under some circumstances.

Typical particle systems which promote the mattness of the film and are therefore preferred are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, calcium, barium, zinc or manganese salts of the dicarboxylic acids used, carbon black, titanium dioxide, kaolin or crosslinked polymer particles, for example polystyrene or acrylate particles.

In addition, mixtures of two or more different particle systems or mixtures of particle systems having the same chemical composition but different particle size may also be selected. The particles may be added to the polymers of the individual layers of the film in the concentrations which are advantageous in each case, for example as a glycolic dispersion during the polycondensation or via masterbatches in the course of the extrusion.

Preferred particles are synthetically produced $SiO_2$ particles (in colloidal form). These particles are very efficiently incorporated into the polymer matrix and only generate a few vacuoles (cavities). Vacuoles form at the particles in the course of biaxial orientation, generally cause opacity and are therefore quite unsuitable for the present invention. To (synthetically) produce the $SiO_2$ particles (also known as silica gel), sulfuric acid and sodium silicate are initially mixed together under controlled conditions to form hydrosol. This eventually becomes a hard, transparent mass which is known as a hydrogel. After separation of the by-produced sodium sulfate by a washing process, it may be dried and further processed. Control of the washing water pH and of the drying conditions allows the important physical parameters, for example pore volume, pore size and the size of the surface of the resulting silica gel, to be varied. The desired particle size (for example the $d_{50}$ value) and particle size distribution (for example the SPAN98) are obtained by suitable grinding of the silica gel (for example mechanically or hydromechanically). Manufacturers of such particles are, for example, Grace (USA), Fuji (Japan), Degussa (Germany) or Ineos (Great Britain).

In a preferred embodiment, the matt overlayer (A) is also characterized by the following set of parameters:

1) The roughness of the matt side of the film, expressed by its $R_a$ value, is in the range from 150 to 1000 nm, preferably from 175 to 950 nm, more preferably from 200 to 900 nm. Values smaller than 150 nm have adverse effects on the degree of mattness of the film; values larger than 1000 nm impair the optical properties of the film.

2) The measurement of the surface gas flow is in the range from 0.1 to 50 s, preferably in the range from 1 to 45 s. At values above 50, the degree of mattness of the film is adversely affected.

3) The coefficient of friction (COF) of the matt side of the film is less than 0.5, preferably less than 0.45 and more preferably less than 0.4.

In a further preferred embodiment of the invention, the planar orientation Δp of the film according to the invention is less than 0.170, in particular less than 0.168 and more preferably less than 0.166.

The base layer (B) may likewise additionally contain customary additives, for example stabilizers and/or particles (=fillers). Advantageous examples of useful stabilizers include phosphorus compounds, such as phosphoric acid or phosphoric esters.

Typical particles (fillers) for the base layer (B) are the inorganic and/or organic particles specified for the overlayers, for example calcium carbonate, amorphous silica, talc, magnesium carbonate, barium carbonate, calcium sulfate, barium sulfate, lithium phosphate, calcium phosphate, magnesium phosphate, aluminum oxide, lithium fluoride, calcium, barium, zinc or manganese salts of the dicarboxylic acids used, carbon black, titanium dioxide, kaolin or crosslinked polystyrene or acrylate particles.

In a particularly advantageous embodiment, the base layer contains no pigments or only pigments introduced via the regrind. This results in a film having very particularly low opacity.

According to the invention, the film is characterized by specific shrinkage behavior which is tailored in particular to the requirements of the thermolamination. According to the invention, the film features a) a transverse shrinkage $s_T$ which is in the range from 1.0 to 2.3%, preferably in the range from 1.2 to 2.2% and more preferably in the range from 1.4 to 2.1%, and b) a TMA in which a linear expansion of the film in the transverse direction within the entire temperature range of not more than 0.20%, preferably of not more than 0.18% and more preferably of not more than 0.16%, is found.

It has been found that in the case that the shrinkage, in particular the transverse shrinkage $s_T$, is less than 1.0%, bubbles and creases occur in the rolled-up film composite in the course of the thermolamination. It has likewise been found that in the case in which the TMA exhibits longitudinal expansion of the film in the transverse direction of more than 0.2%, bubbles and creases likewise occur in the rolled-up film composite.

In the preferred use form, the film consists of three layers, the base layer (B) and overlayers (A) and (C) applied to both sides of the base layer, and (A) and (C) may be the same or different. The overlayer (C) preferably contains the polymers described for the base layer (B). In particular, the layer (C) preferably contains the abovementioned fillers (particles), in order to further improve the processing performance of the film.

Between the base layer (B) and the overlayers (A) and/or (C) may optionally be disposed one or more intermediate layers. These may again consist of the polymers described for the base layer (B). In a particularly preferred embodiment, the intermediate layer consists of the polyester used for the base layer (B). The intermediate layer may also contain the customary additives described. The thickness of the intermediate layer is generally greater than 0.3 μm and is preferably in the from 0.5 to 15 μm, in particular in the range from 1.0 to 10 μm, more preferably in the range from 1.0 to 5 μm.

In the particularly advantageous three-layer embodiment of the film according to the invention, the thickness of the overlayers (A) and (C) is generally in the range from 0.1 to 5.0 μm, preferably in the range from 0.3 to 4.5 μm and more preferably in the range from 0.5 to 4.0 μm, and the matt overlayer (A) and the overlayer (C) may be of the same or different thicknesses.

The total thickness of the polyester film according to the invention may vary within wide limits. It is generally in the range from 3 to 350 μm, in particular from 4 to 300 μm, preferably from 5 to 250 μm, and the base layer (B) accounts for a proportion of preferably from 5 to 97% of the total thickness.

In summary, the film according to the invention features in particular low gloss of the film surface (A), comparatively low opacity and high transparency. In addition it has good winding and processing performance.

The gloss of the film surface A is preferably less than 70. In a preferred embodiment, the gloss of this side is less than 60 and in a particularly preferred embodiment less than 50. This film surface thus imparts a commercially particularly highly effective character and is therefore suitable in particular as the external surface in a packaging.

The opacity of the film is preferably less than 45%. In a preferred embodiment, the opacity of the film is less than 40% and in a particularly preferred embodiment less than 35%. The transparency of the film is preferably greater than 80%. In a preferred embodiment, the transparency of the film is more than 84% and in a particularly preferred embodiment more than 88%. The comparatively low opacity and high transparency of the film (compared with a matt monofilm, see comparative example) allows the film according to the invention to be printed, for example in transfer printing, in which case the definition of the print is very good.

The volume opacity of the film is preferably less than 15%. In a preferred embodiment, the volume opacity of the film is less than 10% and in a particularly preferred embodiment less than 5%.

The invention also relates to a process for producing the polyester film according to the invention by the coextrusion process disclosed by the literature.

The procedure in this process is that the melts corresponding to the individual layers (A), (B) and (C) of the film are coextruded through a flat-film die and shaped to melt films, the film obtained in this way is drawn off on one or more rolls for solidification, the film is subsequently biaxially stretched (oriented), the biaxially stretched film is heat-set and if appropriate also corona- or film-treated on the surface layer intended for treatment.

The biaxial stretching (orientation) is generally carried out in succession, and preference is given to the successive biaxial stretching in which stretching is effected first longitudinally (in machine direction) and then transversely (at right angles to machine direction).

Initially, as is customary in coextrusion processes, the polymer or the polymer mixtures for the individual layers are each compressed and liquefied in an extruder, and any additives provided as additions may be present in the polymer or in the polymer mixture. Preference is given to adding these additives to the starting polymer in the form of masterbatches. The melts are then simultaneously compressed through a flat-film die (slot die), and the extruded multilayer melt is drawn off on one or more takeoff rolls, in the course of which the melt cools and solidifies to a prefilm.

The biaxial stretching is generally carried out sequentially. Preference is given to stretching the prefilm initially in longitudinal direction (i.e. in machine direction=MD) and subsequently in transverse direction (i.e. at right angles to the machine direction, TD). This leads to spatial alignment (orientation) of the polymer chains. The stretching in longitudinal direction can be carried out with the aid of two rolls rotating at different speeds in accordance with the desired stretching ratio. For transverse stretching, an appropriate tenter frame is generally used, into which the film is clamped at both edges and then stretched at both sides at elevated temperature.

The temperature at which the stretching is carried out may vary within a relatively wide range and depends upon the desired properties of the film. In general, the longitudinal stretching is carried out at a temperature in the range from 80 to 130° C. and the transverse stretching in the range from 80 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. Before the transverse stretching, one or both sides of the film may be coated inline by the known processes. The inline coating may serve, for example, to improve adhesion of a metal layer or of a printing ink which might possibly be applied later, or else to improve the antistatic performance or the processing performance of the film.

For the preparation of a film having a very high degree of mattness (=very low gloss) and improved transparency, it has been found to be particularly advantageous when the planar orientation Δp of the film is less than Δp=0.170, preferably less than Δp=0.168 and very preferably less than Δp=0.166. The smaller planar orientation Δp has the consequence that the tendency to form vacuoles around the particles is reduced and the roughnesses of the surfaces tend to increase.

It has been found that the parameters which have a significant influence on the planar orientation Δp are the process parameters in the longitudinal stretching and in the transverse stretching, and also the SV value of the raw material used. The process parameters include in particular the stretching ratios in longitudinal and in transverse direction ($\lambda_{MD}$ and $\lambda_{TD}$) and also the stretching parameters in longitudinal and in transverse direction ($T_{MD}$ and $T_{TD}$). For example, when a machine is used to obtain a planar orientation of the film of Δp=0.171 with the parameter set $\lambda_{MD}$=4.8 and $\lambda_{TD}$=4.0, $T_{MD}$=from 80 to 118° C. and $T_{TD}$=from 80 to 125° C., increasing the longitudinal stretching temperature to $T_{MD}$=from 80 to 125° C. or increasing the transverse stretching temperature to $T_{TD}$=from 80 to 135° C. or reducing the longitudinal stretching ratio to $\lambda_{MD}$=4.3 or reducing the transverse stretching ratio to $\lambda_{TD}$=3.7 results in a planar orientation Δp which is within the desired range. The temperatures specified relate to the particular roll temperatures in the longitudinal stretching, and to the film temperatures which were measured by means of IR in the transverse stretching.

In the subsequent heat-setting, the film is preferably kept at a temperature of from approx. 150 to 250° C. over a period of from about 0.1 to 10 s, and a convergence of from 2 to 6% is preferably established. Subsequently, the film is wound up in a customary manner.

"Convergence" refers to the percentage by which the film is allowed to shrink back after the transverse stretching. The convergence may be varied via the geometry of the tenter chain. Adjustment of the position at which the convergence takes place allows type and duration of the setting to be varied. For the production of films for hot lamination, it has been found to be appropriate when the convergence is in the range from 2 to 6%. Convergence ranges higher than 6% have an adverse effect of too low a shrinkage and leads to bubbles in the end product. Convergence ranges lower than 2% lead to too high a shrinkage and to creases in the end product.

For the production of a film having the inventive shrinkage behavior, in particular to achieve a TMA curve in which a maximum longitudinal expansion of not more than 0.2% occurs, it is necessary to set production conditions which are modified compared to the prior art, in particular in the heat-setting. For example, when a machine is used to obtain a film having a transverse shrinkage of $s_T$=0.2% at a temperature in the heat-setting of 230° C., lowering the temperature in the heat-setting to from 220 to 225° C. allows a transverse shrinkage $s_T$ to be obtained which is within the inventive range. The setting of an earlier conversion or longer setting time (to this end, the convergence in the frame is moved forward toward the commencement of the setting; cf. Example 1) simultaneously achieves a TMA for the film which satisfies the requirements. Variation of the parameters of temperature and setting time in the heat-setting thus allows the controlled setting of shrinkage behavior and TMA of the film (cf. Example 1).

Preference is given, after the biaxial stretching, to corona- or flame-treating one or both surfaces of the film by one of the known methods. Preference is given to setting the intensity of treatment in such a way that the resulting surface tension is in the range of above 45 mN/m.

To establish further desired properties, the film may additionally be coated. Typical coatings are layers having adhesion-promoting, antistatic, slip-improving or release action. One possibility is to apply these additional layers to the film by inline coating, preferably by means of aqueous dispersions, before the stretching step in transverse direction.

The film according to the invention features in particular outstanding optical properties, i.e. low gloss and high transparency, very good handling and very good processing performance.

In addition, when producing the film, it is guaranteed that offcut material which occurs in large amounts in the production of the film can be fed back to the extrusion as regrind in an amount in the range from about 20 to 60% by weight, based on the total weight of the film, without the physical properties of the film being significantly adversely affected, and especially not their optical appearance.

The film is therefore very suitable for use in flexible packaging, and in particular where its outstanding optical properties and its good processibility are used to full effect, for example when used on high-speed packaging machines. In addition, as a consequence of its advantageous shrinkage behavior, the film is suitable for all applications of hot lamination.

The table which follows (Table 1) once again summarizes the most important inventive and preferred film properties.

TABLE 1

| | inventive range | preferred | more preferred | unit | test method |
|---|---|---|---|---|---|
| Overlayer A | | | | | |
| Thickness of the overlayer | >0.1 | 0.3 to 4.5 | 0.5 to 4 | μm | |
| Particle diameter $d_{50}$ | 2.0 to 10 | 2.2 to 9 | 2.4 to 8 | μm | as described |
| SPAN98 spread | ≦2.0 | ≦1.9 | ≦1.8 | — | as described |
| Filler concentration | 10000 to 70000 | 15000 to 65000 | 20000 to 60000 | ppm | |
| Isophthalate content of the polymer | 4 to 30 | 6 to 28 | 8 to 26 | mol % | |
| Average roughness $R_a$ | 150 to 1000 | 175 to 950 | 200 to 900 | nm | DIN 4768, cutoff = 0.25 mm |
| COF A/A | <0.5 | <0.45 | <0.40 | | DIN 53375 |

TABLE 1-continued

|  | inventive range | preferred | more preferred | unit | test method |
|---|---|---|---|---|---|
| Gloss, angle of incidence 60° | <70 | <60 | <50 |  | DIN 67530 |
| Measurement range for the surface gas flow | 1 to 50 | 1 to 45 | 1 to 40 | sec | as described |
| Film properties |  |  |  |  |  |
| Transverse shrinkage $s_T$ | 1.0 to 2.3 | 1.2 to 2.2 | 1.4 to 2.1 | % | DIN 40634 |
| TMA, in the linear expansion of the film in transverse direction | <0.20 | <0.18 | <0.16 | % | as described |
| Opacity | <45 | <40 | <35 | % | ASTM D 1003-52 |
| Transparency | >80 | >84 | >88 |  | as described |
| Volume opacity | <15 | <10 | <5 | % | as described |
| Planar orientation Δp | <0.170 | <0.168 | <0.166 | — | as described |

To characterize the raw materials and the films, the following test methods were used:
DIN=Deutsches Institut für Normung
 [German Institute for Standardization]
ASTM=American Society for Testing and Materials
SV Value (Standard Viscosity)

The standard viscosity SV (DCA) is measured in dichloroacetic acid, based on DIN 53726.

The intrinsic viscosity (IV) is calculated from the standard viscosity as follows:

$$IV(DCA)=6.907 \cdot 10^{-4} SV(DCA)+0.063096$$

Surface Tension

The surface tension was measured by means of what is known as the ink method (DIN 53 364).

Opacity

The opacity was determined according to Hölz based on ASTM-D 1003-52, except that, to utilize the optimum measuring range, measurement was effected on four film plies lying one on top of the other and, instead of a 4° pinhole diaphragm, a 1° slot diagram was used.

Volume Opacity

For the measurement of the volume opacity, a film sample is clamped into a frame and immersed into a cuvette having immersion liquid. The film sample has to be wetted completely with the liquid from both sides. The immersion liquid should have a refractive index between 1.50 and 1.65; for example, an immersion oil from Merck, Germany (No. 104699) having a refractive index of 1.516 was used. The cuvette having the film sample is introduced into the beam path of an opacity measuring instrument. The opacity value is measured and the value of the liquid-filled cuvette without film sample is subtracted as the zero value. The resulting value is equal to the volume opacity value.

Gloss

The gloss was determined to DIN 67 530. The reflector value was measured as a characteristic optical parameter for the surface of a film. Based on the standards ASTM-D 523-78 and ISO 2813, the angle of incidence was 20° or 60°. A light beam hit the flat test surface at the angle of incidence set and is reflected or scattered by it. The light beams incident upon the photoelectronic detector are displayed as a proportional electrical quantity. The measurement is dimensionless and has to be quoted together with the angle of incidence.

Surface Gas Flow Time

The principle of the measurement method is based on the air flow between one side of a film and a smooth silicon wafer plate. The air flows from the environment into an evacuated space, and the interface between film and silicon wafer plate serves as the flow resistance.

A round film specimen is placed on a silicon wafer plate in whose middle there is a hole which ensures the connection to the receptacle. The receptacle is evacuated to a pressure of less than 0.1 mbar. The time in seconds which is taken by the air to bring about a pressure rise of 56 mbar in the receptacle is determined.

Measurement Conditions:

| measurement surface area | 45.1 cm² |
|---|---|
| weight applied | 1276 g |
| air temperature | 23° C. |
| air humidity | 50% relative humidity |
| total gas volume | 1.2 cm³ |
| pressure differential | 56 mbar |

Roughness

The roughness $R_a$ of the film was determined to DIN 4768 at a cutoff of 0.25 mm. Measurement was effected not on a glass plate, but rather in a ring. In the ring method, the film is clamped into a ring, so that neither of the two surfaces touches a third surface (for example glass).

Planar Orientation Δp

The planar orientation was determined via the measurement of the refractive indices with an ABBE® refractometer from Kruss Optronic (Germany). The planar orientation is always measured on the glossier side of the film. The determination of the refractive index has already been reproduced comprehensively, for example, in EP-A-0 952 176, page 10. Reference is therefore made here explicitly to this document. The orientation values are then calculated from the refractive indices by the following formulae $$\Delta n = n_{MD} - n_{TD}$$

$$\Delta p = (n_{MD} + n_{TD})/2 - n_z$$

$$n_{av} = (n_{MD} + n_{TD} + n_z)/3$$

Measurement of the Median Diameter $d_{50}$ (Median Particle Diameter)

The determination of the median particle size $d_{50}$ was carried out on a Master Sizer from Malvern Instruments, Great Britain, by means of laser scanning [other measuring instruments are, for example, HORIBA® LA 500 (Horiba Europe GmbH, Germany) or HELOS® (Sympathec, Germany), which use the same measurement principle]. To this end, the samples were introduced into a cuvette with water and this was then placed in the measuring instrument. Laser is used to scan the dispersion and the signal is compared to a calibration curve to determine the particle size distribution. The particle size distribution is characterized by two parameters, the median value $d_{50}$ (=measure of the position of the average value) and the degree of spread, known as SPAN98 (=measure of the spread of the particle diameter). The measuring procedure is automatic and also includes the mathematical determination of the $d_{50}$ value. By definition, the $d_{50}$ value is determined from the (relative) cumulative curve of the particle size distribution: the point at which the 50% ordinate value cuts the cumulative curve provides the desired $d_{50}$ value on the abscissa axis [also referred to as median, cf. FIG. 1, $\phi(d)$=(relative) sum of the particles].

Measurement of SPAN98

The measurement of the degree of spread, the SPAN98, was carried out with the same measuring instrument as described above for the determination of the average particle diameter $d_{50}$. The SPAN98 is defined as follows:

$$SPAN98 = \frac{d_{98} - d_{10}}{d_{50}}$$

Figure 3:
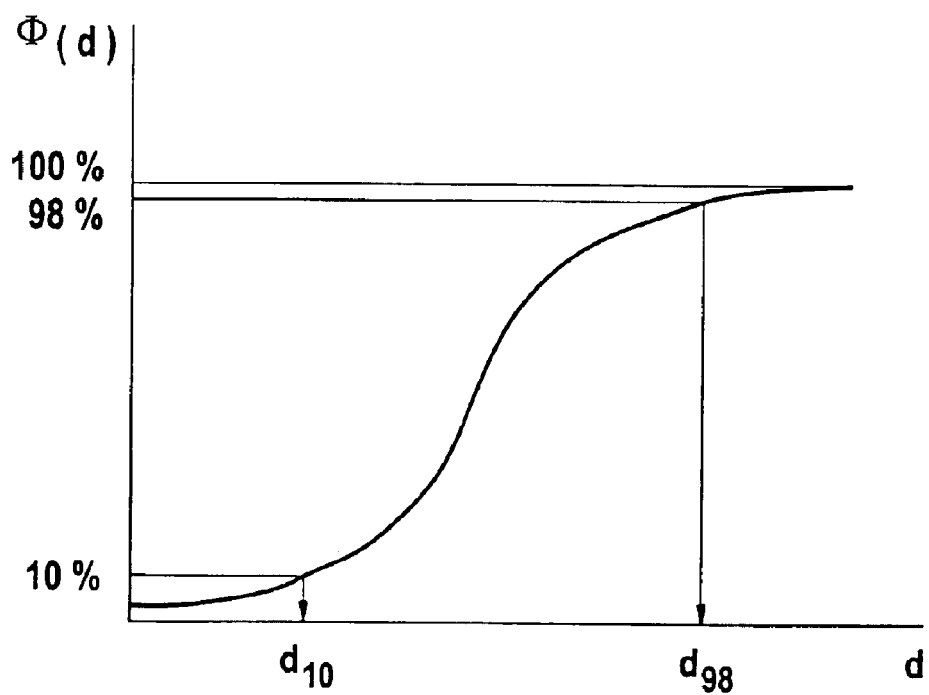
FIG. 3 is an exemplary plot of a cumulative particle size distribution curve illustrating $d_{98}$ and $d_{10}$.

The basis of the determination of $d_{98}$ and $d_{10}$ is again the (relative) cumulative curve of the particle size distribution. The point at which the 98% ordinate value cuts the cumulative curve immediately provides the desired $d_{98}$ value on the abscissa axis, and the point at which the 10% ordinate value of the cumulative curve cuts the curve provides the desired $d_{10}$ value on the abscissa axis (cf. FIG. 3). The transparency was measured using a HAZE® TC from Pausch Messtechnik, Germany, or HAZEGARD-PLUS® from Byk-Gardner, USA, to ASTM D 1003-61.

Shrinkage

The shrinkage of the film is determined to DIN 40634 at a temperature of 150° C. and a shrinkage time of 15 min.

TMA (Thermo-Mechanical Analysis)

For the measurement of the TMA, a test specimen (having the dimensions length=10 mm, width=6 mm) is initially cut out of the middle of the film web and a weight of F=0.035 N is secured to one of the two short sides of the test specimen. In addition to the weight, the film is then secured within a small glass tube in such a way that the film end to which the weight is secured can move freely. The length increase or the shrinkage of the test strip is measured and recorded. In the course of the actual measurement, there is nitrogen flow through the small glass tube. In accordance with the predefined heating program, the temperature of the nitrogen is continuously changed. In the general case, the heating rate v=20 K/min, and the measurement is started at 30° C. and typically ended at 220° C. The result obtained is a plot in which the dimensional change is plotted against the temperature. Positive values mean a lengthening and negative values a shrinkage of the film (cf. Examples).

The invention is illustrated in detail hereinbelow with the aid of examples.

EXAMPLE 1

Chips of polyethylene terephthalate (prepared via the transesterification process using Mn as the transesterification catalyst, Mn concentration in the polymer: 100 ppm) were dried at a temperature of 150° C. to a residual moisture content of below 100 ppm and fed to the extruder for the base layer (B). Chips of polyethylene terephthalate and a filler were likewise fed to the extruder for the nonmatt overlayer (C). In addition, chips of polyethylene terephthalate (prepared via the transesterification process using Mn as the transesterification catalyst, Mn concentration: 100 ppm) were dried at a temperature of 150° C. to a residual moisture content of below 100 ppm and fed together with the filler to the extruder for the matt overlayer (A).

Coextrusion and subsequent stepwise orientation in longitudinal and transverse direction were then used to produce a transparent, three-layer film having ABC structure and an overall thickness of 12 μm. The thickness of the overlayers was in each case 1.2 μm.

Overlayer (A):
  100% by weight of polyester raw material, consisting of 97% by weight of copolyester (of 90 mol % of terephthalic acid, 10 mol % of isophthalic acid and 100 mol % of ethylene glycol) and 3.0% by weight of silica particles (SYLYSIA® 430 from Fuji/Japan) having a $d_{50}$ value of 3.4 μm and a SPAN 98 of 1.6.

Base layer (B):
  100.0% by weight of polyethylene terephthalate 4023 from KoSa, Germany, having an SV value of 800

Overlayer (C), mixture of:
  93.0% by weight of polyethylene terephthalate 4023 from KoSa, Germany, having an SV value of 800
  7.0% by weight of masterbatch of 97.75% by weight of polyethylene terephthalate, 1.0% by weight of Sylobloc® 44 H (synthetic SiO$_2$ from Grace, USA) and 1.25% by weight of AEROSIL® TT 600 (pyrogenic SiO$_2$ from Degussa, Germany)

The production conditions in the individual process steps were:

| Extrusion: | Temperatures | A layer: | 290° C. |
| | | B layer: | 290° C. |
| | | C layer: | 290° C. |
| | Temperature of the takeoff roll | | 25° C. |
| Longitudinal stretching: | Stretching temperature: | | 125° C. |
| | Longitudinal stretching ratio: | | 4.1 |
| Transverse stretching: | Stretching temperature: | | 130° C. |
| | Transverse stretching ratio | | 3.9 |
| | Temperature: | | 230° C. |
| Setting: | Time: | | 3 s |

Figure 4:
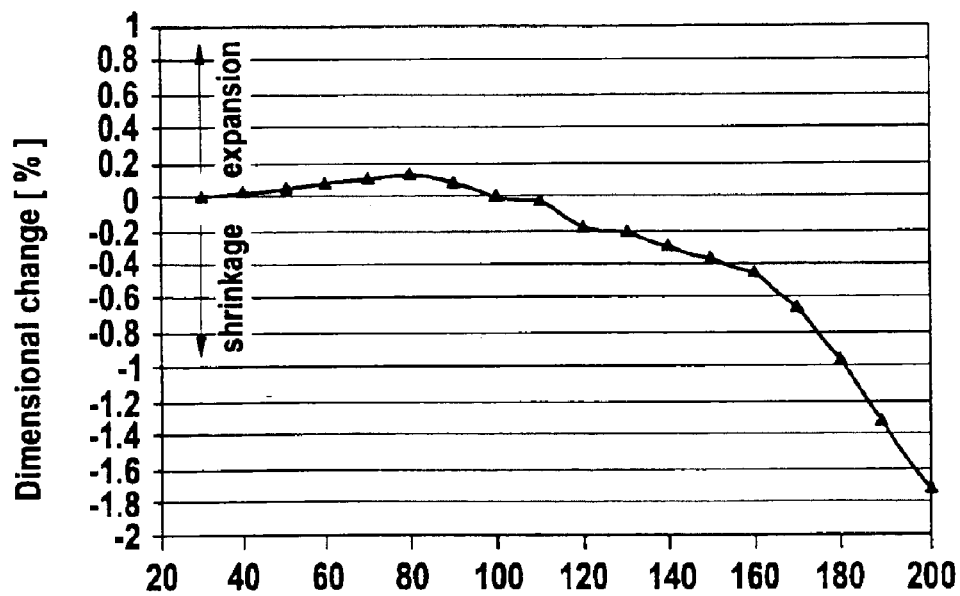
FIG. 4 is an exemplary TMA plot for film formed in accordance with Example 1.

The film had the required low gloss, the required low opacity, the required low volume opacity and the required high transparency. In addition, the film featured the desired shrinkage behavior. To achieve the desired shrinkage behavior, the originally established setting temperature was reduced from 230° C. to 223° C. and the setting time t increased from originally 3 s to 4 s. In order to achieve the latter, the commencement of the convergence was moved forward by an appropriate extent L (the appropriate extent L is dependent upon the film web speed v and is calculated from L=v·t). The corresponding TMA plot is shown in FIG. 4. It was possible to produce the film very efficiently, i.e. without tears, and it also showed the desired processing performance. The film structure and the properties of the films produced in the examples which were achieved are listed in Tables 2 and 3.

EXAMPLE 2

In a similar manner to Example 1, coextrusion was used to produce a three-layer film having an overall thickness of 12 μm. Only the composition of the overlayer A was changed. Otherwise, the conditions, in particular those in the heatsetting, from Example 1 were retained.

Overlayer (A):
  100% by weight of polyester raw material, consisting of 95.5% by weight of copolyester (of 90 mol % of terephthalic acid, 10 mol % of isophthalic acid and 100 mol % of ethylene glycol) and 4.5% by weight of silica particles (SYLYSIA® 430 from Fuji/Japan) having a $d_{50}$ value of 3.4 μm and a SPAN98 of 1.6

The gloss was distinctly reduced compared to Example 1.

EXAMPLE 3

Compared to Example 1, only the formulation of the overlayer A was changed:

Overlayer (A):

100% by weight of polyester raw material, consisting of 95.5% by weight of copolyester (of 80 mol % of terephthalic acid, 20 mol % of isophthalic acid and 100 mol % of ethylene glycol) and 4.5% by weight of silica particles (SYLYSIA® 430 from Fuji/Japan) having a $d_{50}$ value of 3.4 μm and a SPAN98 of 1.6

In comparison to Example 2, the opacity is distinctly reduced and the transparency increased with virtually unchanged gloss.

EXAMPLE 4

Compared to Example 3, the thickness of the overlayer A was increased to 1.8 μm. This allowed the gloss to be reduced without significantly changing the opacity and the transparency.

EXAMPLE 5

Compared to Example 4, the overall thickness of the film was increased to 23 μm. The opacity and transparency of this film are only slightly worse than those of the film of thickness 12 μm.

EXAMPLE 6

Compared to Example 1, only the formulation of the overlayer A was changed:

Overlayer (A):

85% by weight of copolyester (of 78 mol % of terephthalic acid, 22 mol % of isophthalic acid and 100 mol % of ethylene glycol) and 5% by weight of silica particles (SYLYSIA® 430 from Fuji/Japan) having a $d_{50}$ value of 3.4 μm and a SPAN98 of 1.6

15% by weight of polyethylene terephthalate 4023 from KoSa, Germany, having an SV of 800

COMPARATIVE EXAMPLE 1 (CE1)

In comparison to Example 1, the film was now produced with the formulation of the overlayer (A) below. In addition, the originally established setting temperature of 230° C. and the originally established setting time of 3 s were retained.

Figure 5:
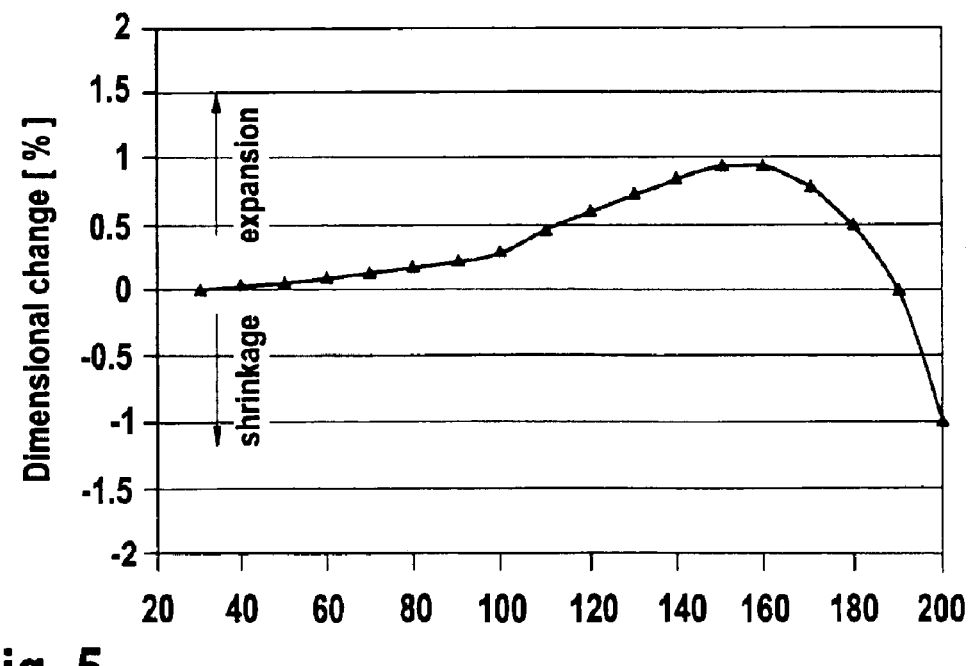
FIG. 5 is an exemplary TMA plot for film formed in accordance with Comparitive Example 1.

Overlayer (A):

100% by weight of polyester raw material consisting of 98% by weight of polyethylene terephthalate and 2.0% by weight of silica particles having a $d_{50}$ value of 3.4 μm The mattness of the film, the opacity and the transparency of the film and the producibility have become distinctly worse. In addition, the inventive shrinkage properties were not established. The corresponding TMA plot is shown in FIG. 5.

Tables 2 and 3 show a compilation of the experimental results.

TABLE 2

| Example | Film thickness in μm | Film structure | Layer thicknesses in μm A | B | C | Particles in the layers A | B | C | $d_{50}$ value of the particles in the layers in μm A | C | Pigment concentrations in ppm A | C | Isophthalate content of the layer A in mol % |
|---|---|---|---|---|---|---|---|---|---|---|---|---|---|
| B 1 | 12 | ABC | 1 | 9.6 | 1.2 | SYLYSIA 430 | none | Sylobloc ® 44 H AEROSIL ® TT 600 | 3.4 | 2.5 | 0.04 | 30 000 | 700 875 | 10 |
| B 2 | 12 | ABC | 1 | 9.6 | 1.2 | SYLYSIA 430 | none | Sylobloc ® 44 H AEROSIL ® TT 600 | 3.4 | 2.5 | 0.04 | 45 000 | 700 875 | 10 |
| B 3 | 12 | ABC | 1 | 9.6 | 1.2 | SYLYSIA 430 | none | Sylobloc ® 44 H AEROSIL ® TT 600 | 3.4 | 2.5 | 0.04 | 45 000 | 700 875 | 20 |
| B 4 | 12 | ABC | 2 | 9 | 1.2 | SYLYSIA 430 | none | Sylobloc ® 44 H AEROSIL ® TT 600 | 3.4 | 2.5 | 0.04 | 45 000 | 700 875 | 20 |
| B 5 | 23 | ABC | 2 | 20 | 1.2 | SYLYSIA 430 | none | Sylobloc ® 44 H AEROSIL ® TT 600 | 3.4 | 2.5 | 0.04 | 45 000 | 700 875 | 20 |
| B 6 | 12 | ABC | 1 | 9.6 | 1.2 | SYLYSIA 430 | none | Sylobloc ® 44 H AEROSIL ® TT 600 | 3.4 | 2.5 | 0.04 | 42 500 | 700 875 | 18.7 |
| CE 1 | 12 | ABC | 1 | 9.6 | 1.2 | SYLYSIA 430 | none | Sylobloc ® 44 H AEROSIL ® TT 600 | 3.4 | 2.5 | 0.04 | 20 000 | 700 875 | 0 |

TABLE 3

| Example | Average roughness $R_a$ A side | C side | Measurement for the gas flow A side | Cside | Planar orientation Δp | Gloss 60° A side | Gloss 20° C side | Opacity (%) | Volume opacity (%) | Transparency (%) | Transverse shrinkage $S_T$ (%) | TMA, max. linear expansion (%) | Production performance |
|---|---|---|---|---|---|---|---|---|---|---|---|---|---|
| B 1 | 280 | 60 | 10 | 130 | 0.165 | 55 | 145 | 35 | 5.2 | 88 | 1.6 | 0.09 | 0 |
| B 2 | 320 | 60 | 9 | 130 | 0.165 | 44 | 140 | 38 | 8.1 | 86 | 1.6 | 0.09 | 0 |
| B 3 | 320 | 60 | 8 | 130 | 0.165 | 46 | 141 | 32 | 1.8 | 89 | 1.6 | 0.09 | ++ |

TABLE 3-continued

| Example | Average roughness $R_a$ A side | Average roughness $R_a$ C side | Measurement for the gas flow A side | Measurement for the gas flow Cside | Planar orientation Δp | Gloss 60° A side | Gloss 20° C side | Opacity (%) | Volume opacity (%) | Transparency (%) | Transverse shrinkage $S_T$ (%) | TMA, max. linear expansion (%) | Production perfor- mance |
|---|---|---|---|---|---|---|---|---|---|---|---|---|---|
| B 4 | 320 | 60 | 8 | 130 | 0.165 | 42 | 138 | 34 | 2 | 87 | 1.6 | 0.09 | 0 |
| B 5 | 320 | 60 | 8 | 130 | 0.165 | 42 | 139 | 36 | 2.7 | 85 | 1.6 | 0.09 | ++ |
| B 6 | 320 | 60 | 7 | 130 | 0.165 | 42 | 139 | 36 | 2.7 | 85 | 1.6 | 0.09 | ++ |
| CE1 | 210 | 60 | 15 | 130 | 0.165 | 70 | 160 | 62 | 26.5 | 79 | 0.3 | 1 | − |

Explanation of symbols for the production performance of the films:
++: no tears, low production costs
−: frequent tears, high production costs of the film

What is claimed is:

1. A polyester film which has at least one base layer (B) and at least one matt overlayer (A), wherein
    a) the transverse shrinkage $s_T$ of the film is from 1 to 2.3%,
    b) the transverse linear expansion of the film during thermo-mechanical analysis (TMA) is smaller than or equal to 0.2%,
    c) the overlayer (A) comprises particles which have a median particle diameter $d_{50}$ of from 2.0 to 10 μm and a SPAN98 smaller than or equal to 2, and
    d) the overlayer (A) comprises a polyester which has from 4 to 30 mol % of isophthalic acid units, based on the total amount of acid in the polyester in this layer.

2. The polyester film as claimed in claim 1, wherein the transverse shrinkage $S_T$ is 1.2 to 2.2%.

3. The polyester film as claimed in claim 1, wherein the linear expansion of the film during TMA is smaller than or equal to 0.18%.

4. The polyester film as claimed in claim 1, wherein the particle concentration in the overlayer (A) is from 10000 to 70000 ppm, based on the total weight of this layer.

5. The polyester film as claimed in claim 1, wherein the particle diameter $d_{50}$ is from 2.2 to 9 μm.

6. The polyester film as claimed in claim 1, wherein the polyester present in the overlayer (A) has from 6 to 28 mol % of isophthalic acid units.

7. The polyester film as claimed in claim 1, wherein the particles present in the overlayer (A) have a SPAN98 smaller than or equal to 1.9.

8. The polyester film as claimed in claim 1, wherein the particles present in the overlayer (A) are at least one of either organic or inorganic particles.

9. The polyester film as claimed in claim 1, wherein the polyester present in the overlayer (A) is a copolyester which comprises terephthalate units, isophthalate units, and ethylene glycol units.

10. The polyester film as claimed in claim 1, wherein the base layer (B) is composed of at least 80% by weight of a thermoplastic polyester.

11. The polyester film as claimed in claim 10, wherein the thermoplastic polyester of the base layer (B) comprises at least one of terephthalic acid units and ethylene glycol units, or naphthalene-2,6-dicarboxylic acid units and ethylene glycol units.

12. The polyester film as claimed in claim 10, wherein polyethylene terephthalate is used as thermoplastic polyester for the base layer (B).

13. The polyester film as claimed in claim 1, wherein no external particles are present in the base layer (B).

14. The polyester film as claimed in claim 1, which has an ABC layer structure, (A) and (C) being the overlayers, which are identical or different.

15. The polyester film as claimed in claim 1, which has a planar orientation Δp smaller than or equal to 0.170.

16. The polyester film as claimed in claim 1, which has an opacity smaller than 45%.

17. The polyester film as claimed in claim 1, which has a volume opacity smaller than 15%.

18. The polyester film as claimed in claim 1, which has a transparency greater than 80.

19. The polyester film as claimed in claim 1, wherein the matt overlayer (A) has a gloss smaller than 70.

20. A process for producing a polyester film as claimed in claim 1, encompassing the steps of:
    a) production of a multilayer film by coextrusion and shaping of the melt to give flat melt films,
    b) biaxial stretching of the film, and
    c) heat-setting of the stretched film.

21. The process as claimed in claim 20, wherein the heat-setting of the stretched film takes place at from 150 to 250° C. for a period of from 0.1 to 10 s.

22. The process as claimed in claim 21, wherein the setting temperature and/or the setting time is/are varied in order to establish the desired shrinkage behavior.

23. Flexible packaging film comprising a polyester film as claimed in claim 1.

24. Flexible packaging film according to claim 23, wherein the packaging procedure takes place on high-speed packaging machinery.

* * * * *